(12) United States Patent
Ziegler

(10) Patent No.: US 10,895,520 B2
(45) Date of Patent: Jan. 19, 2021

(54) RHEOMETER

(71) Applicant: ANTON PAAR GMBH, Graz-Strassgang (AT)

(72) Inventor: Anton Ziegler, Kainbach (AT)

(73) Assignee: Anton Paar GmbH, Graz-Strassgang (AT)

( * ) Notice: Subject to any disclaimer, the term of this patent is extended or adjusted under 35 U.S.C. 154(b) by 138 days.

(21) Appl. No.: 16/289,899

(22) Filed: Mar. 1, 2019

(65) Prior Publication Data
US 2019/0271627 A1    Sep. 5, 2019

(30) Foreign Application Priority Data

Mar. 1, 2018  (AT) .............................. A 50175/2018

(51) Int. Cl.
*G01N 11/14* (2006.01)
*G01N 11/10* (2006.01)
*G01N 11/00* (2006.01)

(52) U.S. Cl.
CPC .... *G01N 11/142* (2013.01); *G01N 2011/0006* (2013.01); *G01N 2011/008* (2013.01); *G01N 2011/145* (2013.01)

(58) Field of Classification Search
CPC combination set(s) only.
See application file for complete search history.

(56) References Cited

U.S. PATENT DOCUMENTS

| | | | |
|---|---|---|---|
| 4,763,512 A * | 8/1988 | Taylor | G01N 11/00 73/54.24 |
| 6,484,567 B1 * | 11/2002 | Hajduk | G01N 3/24 73/54.23 |
| 7,594,429 B2 * | 9/2009 | Liberatore | G01N 11/14 73/54.23 |
| 8,453,496 B2 | 6/2013 | Laeuger et al. | |
| 8,904,852 B2 | 12/2014 | Wollny | |
| 9,267,871 B2 * | 2/2016 | Sierro | G01N 11/165 |
| 9,574,983 B2 | 2/2017 | Santner | |

FOREIGN PATENT DOCUMENTS

| | | |
|---|---|---|
| AT | 508706 B1 | 6/2011 |
| AT | 510042 B1 | 1/2012 |
| AT | 515219 B1 | 7/2015 |

* cited by examiner

*Primary Examiner* — Jewel V Dowtin
(74) *Attorney, Agent, or Firm* — Laurence A. Greenberg; Werner H. Stemer; Ralph E. Locher

(57) ABSTRACT

A rheometer includes a measuring shaft unit being rotatably mounted in a stationary support unit and having a measuring shaft carrying a measuring part. Transmitting units having optical transmitters are disposed on the support unit and receiving units having optical receivers are disposed on the measuring shaft unit for data transmission therebetween. A measuring sensor disposed on the measuring shaft detects at least one parameter. The transmitting and receiving units are disposed between the measuring shaft unit and the support unit and are associated with one another for exchanging data. The optical transmitters on the support unit transmit data and energy to the optical receivers on the measuring shaft unit. The transmitting units feed or transmit to the optical receivers at least energy required by the optical transmitters on the measuring shaft unit and the measuring sensor to output or transmit data to the optical receivers.

15 Claims, 4 Drawing Sheets

RHEOMETER

CROSS-REFERENCE TO RELATED APPLICATION

This application claims the priority, under 35 U.S.C. § 119, of Austrian Patent Application A 50175/2018, filed Mar. 1, 2018; the prior application is herewith incorporated by reference in its entirety.

BACKGROUND OF THE INVENTION

Field of the Invention

The invention relates to a rheometer including at least one measuring shaft unit, preferably a housing or stand, that is rotatably mounted in a stationary support unit and has a measuring shaft that may be driven by a motor, preferably a measuring motor, and carries a measuring part, at least one transmitting unit and at least one receiving unit for data transmission between the measuring shaft unit and the support unit are respectively disposed on the support unit and the measuring shaft unit, and at least one measuring sensor is furnished on the measuring shaft unit for detecting at least one parameter, preferably temperature and/or pressure, of the measuring part and/or a sample under investigation.

Rheometers of that type are known from the prior art. Such rheometers that may be used according to the invention are described for example in Austrian Patent AT 510042 B1, corresponding to U.S. Pat. No. 8,904,852. The fundamental structure of such a rheometer, as it may be used according to the invention, is explained in greater detail below with regard to in FIG. 1. Different embodiments of rotational rheometers having a combined drive and measuring motor are equally as well-known as separate configurations of drive and torque measurement using a separate measuring motor on the respective other measuring part. The functional relationship between current consumption of the measuring motor and torque is known in the art. The evaluation then takes place by using a connected evaluation unit. The user may select and/or input the type of tests, the test parameters and test conditions through a control unit of the rheometer. The results are output by using a display unit. In addition to computer units and conventional keyboards and screens, combined touchscreens and/or multi-touchpads with gesture recognition as well as contactless input aids with, for example, optical or capacitive gesture recognition, may also be used.

There are configurations in which both measuring parts are movable or rotatable, configurations with separate rotary and measuring motors, in which one measuring part may be driven in a rotating or rotating-oscillating manner and the other measuring part is equipped with a measuring axis and the torque acting on that measuring part is ascertained, as well as combinations of a measuring motor with another measuring motor (Austrian Patent AT 508706 B1, corresponding to U.S. Pat. No. 8,453,496) or a linear motor (Austrian Patent AT 515219 B1, corresponding to U.S. Pat. No. 9,574,983).

Although measuring sensors in rheometers with a stationary measuring part may be easily mounted in that measuring part and may easily be connected to the control and evaluation unit, it is difficult to run measurement leads along the measuring axis, which typically moves on air bearings. Inductively transmitting the energy required for the sensors and the measured values influences the sensitive sensing technology of the rheometer motor.

The main aim of the invention is therefore to integrate measuring sensors inside the moving measuring part of the rheometer, so that these sensors may ascertain the measurement data, especially with regard to the condition of the sample between the measuring parts, and transmit this data contactlessly to the evaluation unit without influencing the rheological measurement.

SUMMARY OF THE INVENTION

It is accordingly an object of the invention to provide a rheometer, which overcomes the hereinafore-mentioned disadvantages of the heretofore-known devices of this general type and which simplifies data transmission between the support unit and the measuring shaft unit or additional measuring shaft unit, with particular attention to operational reliability. Furthermore, a sufficient supply of energy must be ensured for the measuring sensor(s) located on the respective measuring shaft unit and a processor unit also located there, together with security of data transmission and simplicity in construction.

With the foregoing and other objects in view there is provided, in accordance with the invention, a rheometer including at least one measuring shaft unit, preferably a housing or stand, being rotatably mounted in a stationary support unit and having a measuring shaft that may be driven by a motor, preferably a measuring motor and carries a measuring part, at least one transmitting unit and at least one receiving unit for data transmission between the measuring shaft unit and the support unit, respectively disposed on the support unit and the measuring shaft unit, and at least one measuring sensor furnished on the measuring shaft unit for detecting at least one parameter, preferably temperature and/or pressure, of the measuring part and/or a sample under investigation, for exchanging data, particularly data that the measuring sensor detects, the transmitting units having optical transmitters, preferably LEDs or laser diodes or light diodes, and the receiving units having optical receivers, preferably photosensors, formed between the measuring shaft unit and the support unit and being associated with one another, and in particular being disposed in opposite planes running perpendicularly to the axis of the measuring shaft, the optical transmitters located on the support unit being configured both for transmitting data and for transmitting energy to the optical receivers on the measuring shaft unit, and these transmitting units feeding or transmitting to these receivers at least the energy that the optical transmitters located on the measuring shaft unit and the measuring sensor require in order to output or transmit data to the optical receivers.

The optical transmitters and optical receivers may be disposed and configured swiftly and economically and may be constructed to be reliable in operation, and the energy required to process the measurement data in the processor unit and operate the measuring sensor on the measuring shaft or on the measuring shaft unit may also be transmitted simultaneously with the data that is needed on the measuring shaft unit. The components used for this purpose are optical transmitters, preferably LEDs or laser or light diodes.

The optical transmitters thus have a dual function and are accordingly controlled by the processor unit or the control and evaluation unit. Advantageously, the processor unit may supply the energy transmitted to the optical receivers, preferably photosensors, for sending the detected measured values to the measuring sensor and the at least one optical transmitter, for evaluating incoming data signals and for storing excess energy if necessary.

The structure and operation are simplified if a processor unit is provided on the measuring shaft unit and this processor unit controls both outputting data from the measuring shaft unit to the support unit and receiving data and/or energy from the support unit, and/or prepares the measured values that have been ascertained by the measuring sensor and feeds these measured values to the at least one optical transmitter that is furnished for transmitting data to the support unit, and/or if a control and evaluation unit is provided on the support unit so that using it makes it possible to control the output of data and/or energy to the optical receivers located on the measuring shaft unit and the reception and evaluation of data obtained from the optical transmitters located on the measuring shaft unit.

It is advantageous if the processor unit and/or control and evaluation unit regulate the energy and/or intensity of light that the optical transmitters emit.

In order to transmit data simply and precisely, it is expedient if at least one switching unit is respectively furnished on the support unit and/or measuring shaft unit or in the processor unit and the control and evaluation unit, and if the light and/or energy radiation of the optical transmitters may be clocked by using this switching unit, with the clocking representing a code that the switching unit has predetermined for the data to be transmitted, and that may be decoded in the processor unit and/or control and evaluation unit.

The resulting structure is simple if an optical transmitter is furnished on the measuring shaft for transmitting data, and an associated optical receiver is provided on the support unit for receiving this data, these optical transmitters being located centrally on the measuring shaft in the region of the rotation axis, optionally on the end face or circumferential surface of the measuring shaft, and the associated optical receiver is disposed on the support unit facing the measuring shaft in the circumferential or surrounding region, or the optical transmitter disposed on the measuring shaft unit for data output is disposed at the end face in the end region of the measuring shaft that is far from the measuring part, and the optical receiver assigned to this optical transmitter is disposed opposite to it, on the support unit in the interior region of the motor.

With a view to weight compensation or avoiding an uneven distribution of mass, it may be provided that a plurality of optical receivers set up to receive energy are disposed on the measuring shaft unit and/or a plurality of energy-emitting optical transmitters are disposed on the support unit, preferably respectively on a circuit board, on the circumference of a circle the center of which is in the axis of rotation of the measuring shaft, and are preferably distributed symmetrically around to the axis of rotation.

Other features which are considered as characteristic for the invention are set forth in the appended claims.

Although the invention is illustrated and described herein as embodied in a rheometer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
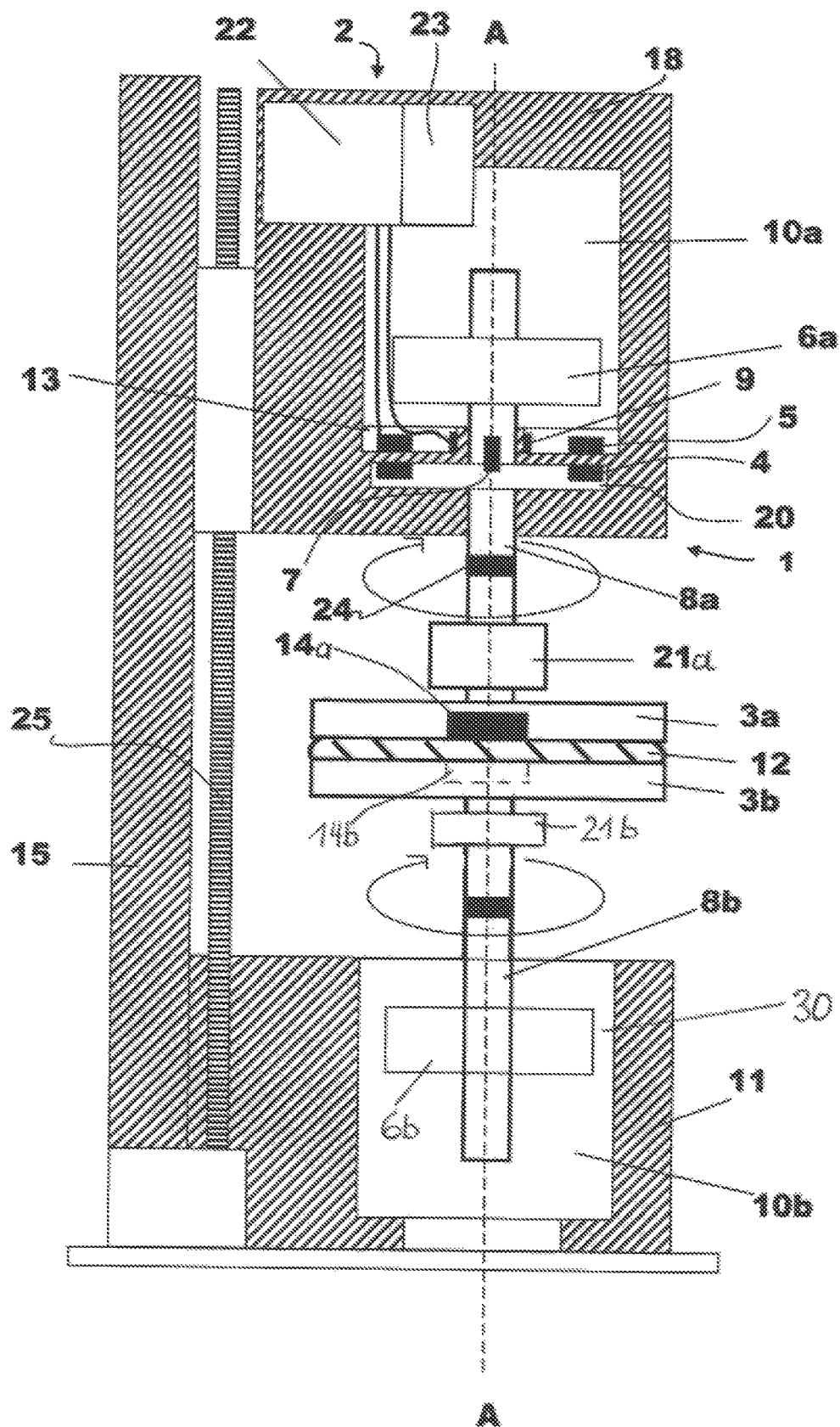
FIG. 1 is a diagrammatic, sectional view of a rheometer.

Referring now to the figures of the drawings in detail and first, particularly, to FIG. 1 thereof, it is seen that the objective of the invention is simplify data transmission between a support unit 2 and a measuring shaft unit 1 or an additional measuring shaft unit 30, with particular attention to operational reliability. Furthermore, a sufficient supply of energy must be ensured for measuring sensor(s) 14a, 14b located on the respective measuring shaft units 1, 30 and a processor unit 21a, 21b also located there, together with the security of data transmission and simplicity in construction.

The processor unit 21a or 21b contains the electronics for operating at least one sensor in the measuring part, for example an AD converter for measurement data, as well as, if necessary, an energy storage device (capacitor) that ensures a supply of electric current for the transmission operation of the measuring shaft unit. A data storage unit may contain data relating to the measuring body such as geometry data and/or calibration data of the measuring part being used, thus making the measuring part simpler to replace.

Hereinafter, a stationary part of the rheometer is referred to as the support unit 2, and a rotating part with a measuring sensor is referred to as the measuring shaft unit 1. A rheometer according to the invention may also have the first and second measuring shaft units 1, 30, which are able to rotate with respect to the support unit 2 and relative to each other. In this case, a measuring sensor may be disposed on the upper and/or lower measuring part. The upper measuring shaft unit includes the upper measuring part, which is rotatable together with its upper measuring shaft. The lower measuring shaft unit includes the lower measuring part, which may be rotated with its lower measuring shaft. The measured values that the measuring sensor of the respective measuring shaft unit 1, 30 provides are supplied to an evaluation unit.

The support unit 2 includes a housing 18, a stand 15 and a base frame 11. The housing 18 is height-adjustably guided on the base frame 11 by a spindle drive 25. A motor 10a, in particular a measuring motor, is located inside the housing 18 and rotates a measuring shaft 8a of the measuring shaft unit 1. The measuring shaft 8a is rotatably mounted with air bearings 6a in the housing 18. The measuring shaft 8a, in its lower end region, supports an upper measuring part 3a. This measuring part 3a interacts with a lower measuring part 3b that is mounted so as to be either fixed to the base frame 11 or rotatable by a second measuring motor 10b. The lower second measuring shaft unit 30 may in principle have the same construction and include the same components as the upper measuring shaft unit. Accordingly, there may be an additional air bearing 6b, an additional motor 10b and an additional measuring shaft 8b. All embodiments for the measuring shaft unit 1 apply likewise to the additional measuring shaft unit 30. The additional measuring shaft unit 30 may be extended substantially until it becomes identical to the measuring shaft unit 1. In that case, an additional processor unit 21b and at least one additional measuring sensor 14b and corresponding LEDs, photosensors, circuit boards etc. are installed.

A sample 12 under examination is located between the upper measuring part 3a and the lower measuring part 3b. The upper and/or lower measuring parts 3a, 3b support at least one measuring sensor 14 for measuring the temperature of the sample 12 and/or respective measuring part 3a, 3b and/or the pressure in the sample 12 and for any additional measured variables. A diagrammatically-depicted control and evaluation unit 22 serves to evaluate measured values, and also controls or senses the respective measuring motor 10a, 10b. The measuring parts may have various geometries in addition to the plate-plate geometry shown. Geometries that are known in the art include e.g. concentric cylinder measuring systems and cone-plate-measuring systems, as well as specialized configurations for different application areas, for example measuring the immobilization behavior of dispersions or building materials, electro-rheological measurements, etc. Rheometers with these measuring parts or combinations of measuring parts may also be equipped with measuring sensors furnished according to the invention and connected to the measuring shaft through a coupling 24.

In the following, the invention will be explained in greater detail in relation to optical transmitters and optical receivers. "Optical transmitters" refer to all electronic components that emit light and light energy, such as LEDs, laser diodes, light diodes, and the like. "Optical receivers" refer to electronic components that receive light and light energy, such as photosensors and the like.

Figure 2:
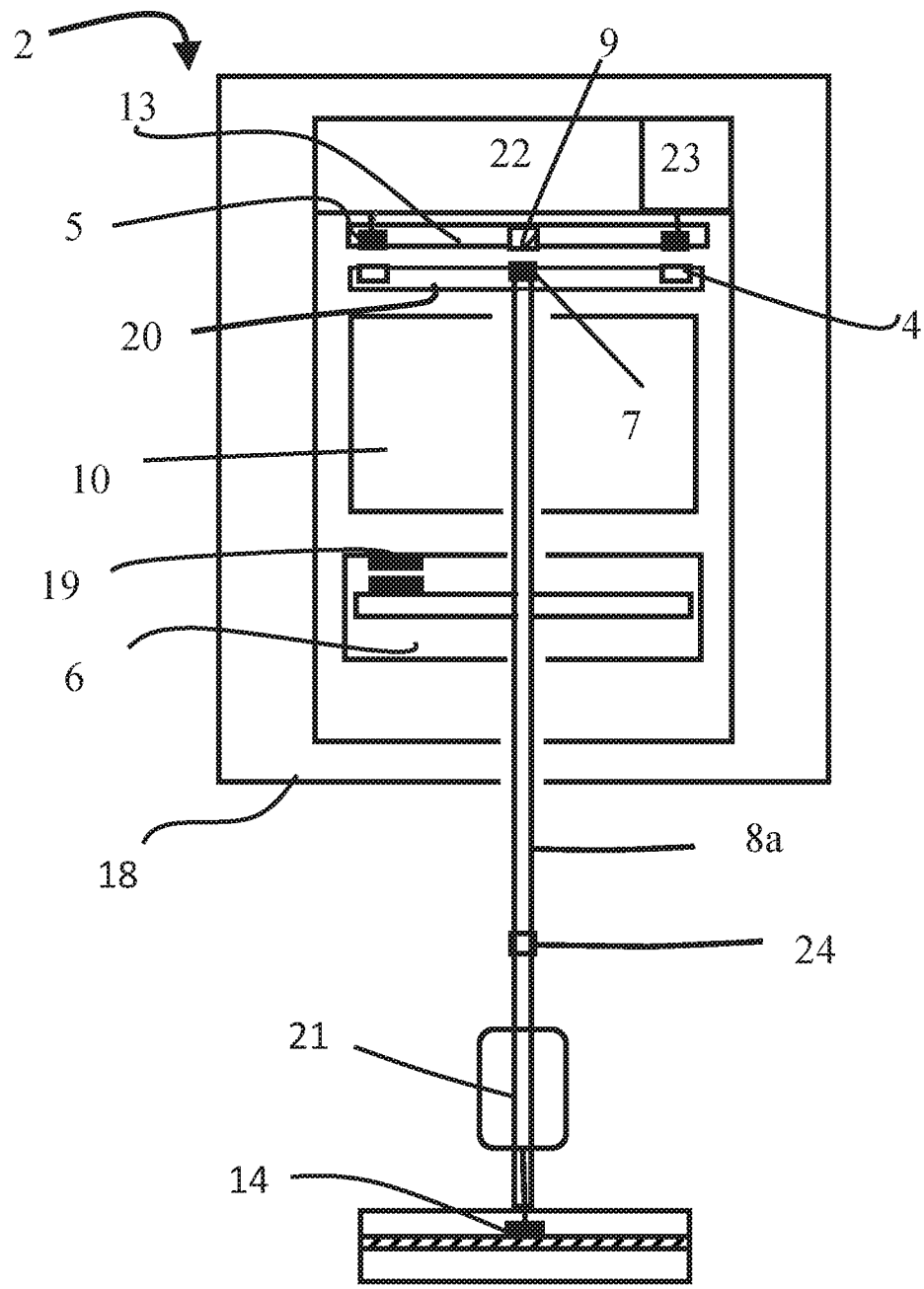
FIG. 2 is an enlarged, fragmentary sectional view
Figure 3:
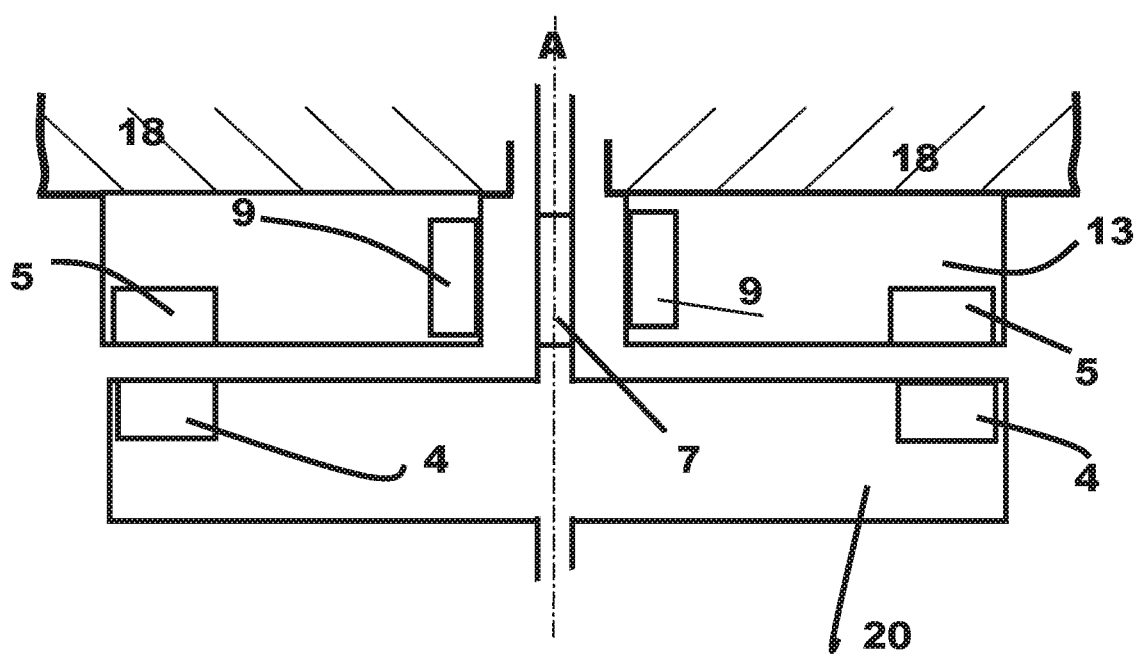
FIG. 3 is an enlarged sectional view of an upper part of the rheometer.

As FIGS. 1-3 show, the measuring shaft 8a supports a mounting part or circuit board 20, which is fixedly connected to the measuring shaft 8a or may be rotated with it. Receiving units 4 in the form of optical receivers 4, preferably photosensors, are provided on the mounting part or on this circuit board 20, and optical transmitters 5, which are provided on the housing 2 or on the motor 10a, preferably LEDs and/or laser diodes and/or light diodes, beam light onto these receivers.

The optical transmitters 5, as well as the optical receivers 4, may respectively be disposed around an axis A of the measuring shaft 8a on a ring-shaped mounting part that is formed, for example, from the circuit board 20 or a circuit board 13. The optical receivers 4 and the optical transmitters 5 are located opposite each other with the circuit boards 13 and 20 disposed parallel to each other, and if the board 20 is rotated relative to the board 13, care is taken to ensure that the light of the optical transmitters 5 will always strike an associated optical receiver 4. For this purpose, the radiation of the optical transmitters 5 or the beam angle is set up or selected in such a way that the light spots that form on the circuit board 20 overlap, so that all optical receivers 4 are illuminated at all times. In this way, data transmission and energy supply are always ensured. The transmitted data is principally measurement data from the measuring sensor 14, but also includes environmental parameters in the region of the measuring part 3a or parameters of the measuring part 3a itself.

Leads that run from the optical receivers 4 to a processor unit 21a located on the measuring shaft 8a in the area of the upper measuring part 3a are not shown. These leads may be routed inside the measuring shaft 8a. The processor unit 21a is connected by a non-illustrated lead to the measuring sensor 14a, which is located directly on the upper measuring part 3a.

The optical transmitters 5 located on the housing 2 and/or the motor 10a are connected through cables to the control and evaluation unit 22, through the use of which the energy and/or intensity that the optical transmitters 5 emit may be adjusted, controlled or clocked.

At least one optical transmitter 7 on the measuring shaft unit 1 and at least one optical receiver 9 on the support unit 2 are used to transmit data from the measuring shaft unit 1 to the support unit 2. As is shown in FIGS. 1 and 3, the optical transmitters 7 may be located at the circumferential region of the measuring shaft 8a or, as shown in FIG. 2, they may be located at the end face of the measuring shaft 8a and thus in a preferred embodiment, they may be on the measuring axis A.

Fundamentally, the measuring shaft unit 1 of the rheometer includes the drive or motor 10a for the measuring shaft 8a, the bearing 6a that may, for example, be an air bearing, a unit for measuring a normal force NF and, if necessary, an angle measuring unit which is connected to the control or evaluation unit 22 in accordance with the construction of the invention. In the case shown, a normal force measurement unit 19 is integrated inside the air bearing. The torque is usually determined based on the motor current. Any type of motor may be used. The rotation may be measured optically with a measuring sensor that is either attached to or senses the measuring shaft 8a. Examples of such implementations may be found in the publications mentioned above. The transmission of energy and data according to the invention is not bound to the actual rheometer implementation being used.

Figure 4:
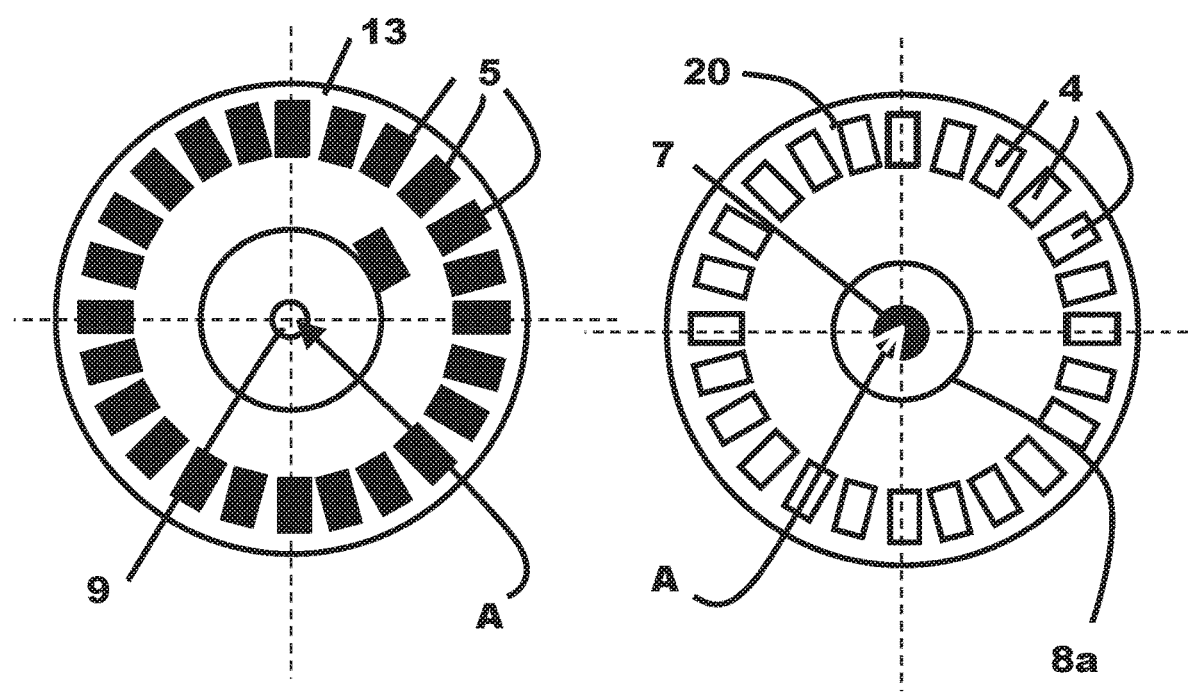
FIG. 4 includes two plan views showing configurations of optical transmitters and optical receivers on circuit boards.

FIG. 4 shows the optical transmitters 5, 7 and optical receivers 4, 9 pre-assembled on the circuit boards 13, 20. It is advantageous to configure the parts 13 and/or 20 in the form of ring-shaped circuit boards that are prefabricated to support the optical transmitters 5 and optical receivers 4 and are replaceably mounted on the measuring shaft 8a or in the housing 2. As is shown in FIG. 2, a circuit board 20 may be mounted on the side of the measuring shaft 8a that faces away from the measuring part, while the circuit board 13 is mounted on the motor housing and is situated opposite the circuit board 20. Both circuit boards 13 and 20 are preferably rotationally symmetrical around the axis A, which is especially advantageous for a circuit board that moves with the measuring shaft. As a general matter, the optical receivers 4 and/or optical transmitters 5 may be mounted independently of each other on the housing 18 or on the circuit board 20 or it is possible to place and wire the optical transmitters 5 and the optical receivers 4 in the desired position on prefabricated boards and then to mount them on the housing 2 or on the motor 10a or on the measuring shaft 8a or on the mounting part 20.

It is also possible to mount the circuit board 13 or the parts that support the optical transmitter 5 on the motor 10 or housing 2 in such a way that, for purposes of transmission, the photosensor(s) 9 are directly opposite an optical transmitter 7 supported by the measuring shaft 8a.

In principle it is also possible, as shown in FIG. 2, to feed the measuring shaft 8a through the air bearing 6 and the motor 10 and then out above of the motor 10, and to place the mounting part 20 and the circuit board 13 above the motor 10 or in the upper end area of the housing 18 or support unit 2. In this case, an end-face configuration of the optical transmitters 7 on the measuring shaft 8a opposite a photosensor 9 centrally disposed on the circuit board 13 has proven successful.

With the control unit 22 located on the support unit 2, the luminous intensity of the optical transmitters, especially the optical transmitters 5, may be regulated so as to adapt the permissible voltage of the optical receiver 4 of the measuring shaft unit 1.

The energy input must not produce too high a voltage in the components on the measuring shaft unit 1. This is especially important for accurately transmitting and recognizing data. For this purpose, the processor unit 21 ascertains how high the voltage at the optical receivers 4 is, as a result of the irradiated energy. By transmitting the corresponding data to the control and evaluation unit 22 or a switching unit 23 and adjusting the operating voltage of the optical transmitter 5, the energy transmission or supply may be kept at an optimal value.

Through the use of the coupling 24 furnished on the measuring shaft 8a, the upper measuring part 3a as well as the measuring sensor 14 and the processor 21 may be replaced together, in order to adapt them to different samples 12.

Through the use of the optical transmitters 5, a uniform or continuous illumination of the optical receivers 4, which may rotate relative to the optical transmitters 5 during the measurement, may be ensured. The optimal number of optical transmitters 5, which are preferably distributed uniformly around the measuring axis A or the measuring shaft 8a, is a function of the size of the optical transmitters, which is obtained from the circumference of the circuit boards 13 or the support part and the beam angle of the optical transmitters. Optical transmitters, particularly LEDs, have a defined beam angle that may be found in their respective data sheets. Optical transmitters are preferred that have a beam angle of 60°. The mutual distance of the optical transmitters along the circumference of the circuit board 13 is selected in such a way that the emitted light cones overlap on the supporting part in such a way that the illumination of all optical receivers 4 is kept as constant as possible, even when the mounting part 20 is being rotated relative to the circuit board 13. In this way, it may be ensured that the energy and data transmission is independent of the angular position of the measuring part 3a or the measuring shaft 8a relative to the housing 2 or motor 10.

The embodiments discussed with respect to the measuring shaft unit 1, concerning optical transmitters, optical receivers and data and energy transmission, apply in the same way to the additional measuring shaft unit 30.

Light is defined as electromagnetic radiation from the IR to the UV range.

In a preferred embodiment of the invention, the processor unit 21a, 21b and/or the control and evaluation unit 22 have a control unit in which is disposed a setpoint memory for a setpoint for the energy radiated into the photosensors 4 from the optical transmitters 5, 7 and the voltage formed at the optical receivers 4, in particular photosensors. A comparison circuit is connected to the setpoint memory, and by using this comparison circuit, the setpoint may be compared with an actual value that corresponds to the irradiated energy and the voltage formed thereby, and the energy emitted by the optical transmitters 5, 7 may be regulated based on the result of the comparison. In this way, overloading the electronic components, particularly the photosensors, may be avoided. In addition, the energy infeed may be balanced relative to the circuit board 13, especially when the mounting part 20 is rotated.

The invention claimed is:

1. A rheometer, comprising:
a stationary support unit;
at least one measuring shaft unit being rotatably mounted in said stationary support unit, said at least one measuring shaft unit having a measuring shaft carrying a measuring part;
transmitting units having optical transmitters and being disposed on said support unit and receiving units having optical receivers and being disposed on said at least one measuring shaft unit for data transmission between said at least one measuring shaft unit and said support unit;
at least one measuring sensor disposed on said at least one measuring shaft unit for detecting at least one parameter;
said transmitting units and said receiving units being formed between said at least one measuring shaft unit and said support unit and being associated with one another for exchanging data;
said optical transmitters located on said support unit being configured both for transmitting data and for transmitting energy to said optical receivers located on said at least one measuring shaft unit; and
said transmitting units feeding or transmitting to said optical receivers at least energy required by said optical transmitters located on said at least one measuring shaft unit and said at least one measuring sensor to output or transmit data to said optical receivers.

2. The rheometer according to claim 1, wherein:
said at least one measuring shaft unit includes a housing or a stand;
said measuring shaft is driven by a motor or a measuring motor;
said at least one parameter is at least one of temperature or pressure of at least one of said measuring part or a sample under investigation;
said data are data detected by said measuring sensor;
said optical transmitters are LEDs, laser diodes or light diodes;
said optical receivers are photosensors; and
said transmitting units and said receiving units are disposed in opposite planes oriented perpendicularly to an axis of said measuring shaft.

3. The rheometer according to claim 1, wherein:
one of said optical transmitters is provided on said at least one measuring shaft for sending data and an associated one of said optical receivers is provided on said support unit for receiving said data;
said optical transmitters are mounted on said measuring shaft, centrally in a region of an axis of rotation or at an end face or on a circumferential surface of said measuring shaft; and
an associated optical receiver is located on said support unit of said measuring shaft, disposed in a surrounding or circumferential area and oriented opposite said measuring shaft or an end face of said measuring shaft.

4. The rheometer according to claim 1, which further comprises at least one of:
a plurality of said optical receivers for receiving energy being disposed on said at least one measuring shaft unit or
a plurality of said optical transmitters for emitting energy being disposed on said support unit.

5. The rheometer according to claim 4, which further comprises circuit boards respectively receiving said optical receivers and said optical transmitters disposed along a circumference of a circle with a center point in an axis of rotation of said measuring shaft or distributed centrally symmetrically about the axis of rotation.

6. The rheometer according to claim 1, which further comprises at least one of:
- a processor unit provided on said at least one measuring shaft unit, said processor unit at least one of controlling both outputting data from said at least one measuring shaft unit to said support unit and receiving at least one of data or energy from said support unit or preparing measured values having been ascertained by said measuring sensor and feeding said measured values to at least one of said optical transmitters for transmitting data to said support unit, or
- a control and evaluation unit provided on said support unit for controlling an output of at least one of data or energy to said optical receivers located on said at least one measuring shaft unit and for reception and evaluation of data obtained from said optical transmitters located on said at least one measuring shaft unit.

7. The rheometer according to claim 6, wherein said processor unit supplies the energy transmitted to said optical receivers to said measuring sensor and said at least one optical transmitter for sending the detected measured values, evaluates incoming data signals and stores excess energy if appropriate.

8. The rheometer according to claim 6, which further comprises at least one switching unit disposed in at least one of said support unit or said at least one measuring shaft unit or said processor unit and in said control and evaluation unit, said switching unit being configured to clock at least one of light or energy radiation of said optical transmitters with a clocking representing a code predetermined by said switching unit for the data to be transmitted to be decoded in at least one of said processor unit or said control and evaluation unit.

9. The rheometer according to claim 8, wherein at least one of said processor unit or said control and evaluation unit regulates at least one of the energy or intensity of light emitted by said optical transmitters.

10. The rheometer according to claim 2, wherein said optical transmitter disposed on said at least one measuring shaft unit for data output is disposed on an end face in an end region of said measuring shaft far from said measuring part, and said photosensor associated with said optical transmitter is disposed opposite said transmitter on said support unit in an interior region of said motor.

11. The rheometer according to claim 2, wherein said optical transmitters located on said support unit are directly supported by said motor or said support unit.

12. The rheometer according to claim 2, which further comprises:
- a first circuit board having a circumference along which said optical transmitters are distributed; and
- a second circuit board or mounting part disposed opposite said first circuit board for supporting said optical receivers.

13. The rheometer according to claim 12, wherein said first circuit board is circular and is supported by said support unit or said motor.

14. The rheometer according to claim 1, wherein said optical transmitters have a predetermined beam angle and are located at an offset from said optical receivers causing light cones emitted by said optical transmitters to overlap in an area covered by said optical receivers while rotating about an axis of said measuring shaft or illuminating the area continuously or completely.

15. The rheometer according to claim 6, wherein:
- at least one of said processor unit or said control and evaluation unit has a control unit containing a setpoint memory for a setpoint for energy radiated from said optical transmitters to photosensors and for voltage formed at said optical receivers or photosensors; and
- a comparison circuit is connected to said setpoint memory for comparing said setpoint with an actual value corresponding to irradiated energy and voltage formed thereby, and for regulating energy emitted by said optical transmitters based on a result of said comparison.

* * * * *